United States Patent
Butler et al.

(10) Patent No.: US 6,889,505 B2
(45) Date of Patent: May 10, 2005

(54) PULSE DETONATION SYSTEM FOR A GAS TURBINE ENGINE

(75) Inventors: Lawrence Butler, Cincinnati, OH (US); Kattalaicheri Srinivasan Venkataramani, West Chester, OH (US); Kurt David Murrow, Indian Springs, OH (US); Ivett Alejandra Leyva, Marina del Rey, CA (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 10/405,561

(22) Filed: Apr. 2, 2003

(65) Prior Publication Data

US 2004/0194469 A1 Oct. 7, 2004

(51) Int. Cl.[7] .............................................. F02C 5/00
(52) U.S. Cl. ..................... 60/776; 60/226.1; 60/39.78
(58) Field of Search ............................. 60/776, 39.76, 60/39.78, 39.34, 226.1

(56) References Cited

U.S. PATENT DOCUMENTS

| | | | | | |
|---|---|---|---|---|---|
| 1,969,753 | A | * | 8/1934 | Holzwarth | 60/772 |
| 3,088,276 | A | * | 5/1963 | Hudson | 60/39.6 |
| 3,089,307 | A | * | 5/1963 | Kollander | 60/39.34 |
| 3,263,418 | A | * | 8/1966 | Lange et al. | 60/247 |
| 3,321,911 | A | * | 5/1967 | Myles | 60/39.35 |
| 3,365,880 | A | * | 1/1968 | Grebe | 60/773 |
| 3,541,787 | A | * | 11/1970 | Romoli | 60/776 |
| 5,138,831 | A | * | 8/1992 | Cowan, Sr. | 60/39.34 |
| 5,345,758 | A | | 9/1994 | Bussing | 60/39.38 |
| 5,901,550 | A | | 5/1999 | Bussing et al. | 60/39.38 |
| 6,000,214 | A | * | 12/1999 | Scragg | 60/39.38 |
| 6,349,538 | B1 | | 2/2002 | Hunter, Jr. et al. | 60/204 |
| 6,505,462 | B2 | | 1/2003 | Meholic | 60/39.39 |
| 2004/0000145 | A1 | * | 1/2004 | Leyva et al. | 60/772 |

* cited by examiner

*Primary Examiner*—Ehud Gartenberg
(74) *Attorney, Agent, or Firm*—William Scott Andes; James P. Davidson (57) ABSTRACT

A pulse detonation system for a gas turbine engine having a longitudinal centerline axis extending therethrough includes a rotatable cylindrical member having a forward surface, an aft surface, and an outer circumferential surface, where at least one stage of circumferentially spaced detonation chambers is disposed therein. The pulse detonation system further includes a shaft rotatably connected to the cylindrical member and a stator configured in spaced arrangement around the forward surface, the aft surface, and the outer circumferential surface of the cylindrical member and a portion of the shaft. The stator has at least one group of ports formed therein which sequentially align with the detonation chambers as the cylindrical member rotates. In this way, detonation cycles are performed in the detonation chambers of each detonation stage so that reaction forces induced by the detonation cycles create a torque which causes the cylindrical member to rotate. Each detonation chamber includes a first open end located adjacent the outer circumferential surface of the cylindrical member and a second closed end located within a middle portion of the cylindrical member.

46 Claims, 11 Drawing Sheets

PULSE DETONATION SYSTEM FOR A GAS TURBINE ENGINE

BACKGROUND OF THE INVENTION

The present invention relates generally to a pulse detonation system for a gas turbine engine and, in particular, to a pulse detonation system which is able to replace the core of a gas turbine engine without use of an externally actuated valve system.

It is well known that typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been obtained by operating the engine so that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave and are propagated at the speed of sound relative to the detonation wave while simultaneously providing a significant pressure rise. Such combustion products then exit through a nozzle to produce thrust. Examples of a pulse detonation engine are disclosed in U.S. Pat. No. 5,345,758 to Bussing and U.S. Pat. No. 5,901,550 to Bussing et al.

Simple pulse detonation engines have no moving parts with the exception of various forms of externally actuated valves. Such valves are used to control the duration of the fuel/air introduction and to prevent backflow of combustion products during the detonation process. An example of a rotary valve utilized for pulse detonation engines is disclosed in U.S. Pat. No. 6,505,462 to Meholic. While such pulse detonation configurations have advanced the state of the art, the valves and associated actuators are subjected to very high temperatures and pressures. This not only presents a reliability problem, but can also have a detrimental effect on the turbomachinery of the engine.

One type of pulse detonation system which has eliminated the need for a separate valve is disclosed in a patent application entitled "Pulse Detonation Device For A Gas Turbine Engine," having Ser. No. 10/383,027 and being owned by the assignee of the present invention. It will be noted therein that the pulse detonation device includes a stationary air inlet duct and a ring member which rotates therearound. The various events of the detonation take place within detonation ducts associated with the ring member, as air and fuel are injected and a detonation wave is initiated therein. In this configuration, the aft portion of the rotatable ring member is connected to a drive shaft in a cantilevered manner. The air ports, fuel injectors and initiation devices are located adjacent an outer surface of the air inlet duct so as to be sequentially aligned with an inner end of the detonation ducts, which are open at each end, as the ring member rotates.

Accordingly, it would be desirable for a pulse detonation system to be developed for a gas turbine engine which is able to operate the engine without the need for a separate valve. Further, it would be desirable for such pulse detonation system to be adaptable to a gas turbine engine for both aeronautical and industrial applications so as to eliminate the core (i.e., a high pressure compressor, combustor, and high pressure turbine). It is also desirable that the pulse detonation system include a simpler connection to a drive shaft in the gas turbine engine which eases access to components for manufacturing and maintenance purposes.

BRIEF SUMMARY OF THE INVENTION

In a first exemplary embodiment of the invention, a pulse detonation system for a gas turbine engine having a longitudinal centerline axis extending therethrough is disclosed. The pulse detonation system includes a rotatable cylindrical member having a forward surface, an aft surface, and an outer circumferential surface, where at least one stage of circumferentially spaced detonation chambers is disposed therein. The pulse detonation system further includes a shaft rotatably connected to the cylindrical member and a stator configured in spaced arrangement around the forward surface, the aft surface, and the outer circumferential surface of the cylindrical member and a portion of the shaft. The stator has at least one group of ports formed therein which sequentially align with the detonation chambers as the cylindrical member rotates. In this way, detonation cycles are performed in the detonation chambers of each detonation stage so that reaction forces induced by the detonation cycles create a torque which causes the cylindrical member to rotate. Each detonation chamber includes a first open end located adjacent the outer circumferential surface of the cylindrical member and a second closed end located within a middle portion of the cylindrical member.

In a second exemplary embodiment of the invention, a method of providing power to a drive shaft in a gas turbine engine is disclosed as including the following steps: providing a rotatable cylindrical member having at least one stage of circumferentially spaced detonation chambers therein; providing a stator in spaced relation around the cylindrical member, where the stator has at least one group of ports formed therein; connecting the cylindrical member to a drive shaft; performing a detonation cycle in each detonation chamber; and, producing a torque on the cylindrical member which causes the cylindrical member and the drive shaft to rotate. The detonation cycle further includes the steps of supplying compressed air to the detonation chambers, injecting fuel into the detonation chambers, initiating a detonation wave in the detonation chambers and exhausting the products of combustion from the detonation chambers. The method may further include the steps of causing the cylindrical member to rotate at a predetermined speed prior to injecting fuel into the detonation chambers and purging combustion gases from the detonation chambers.

In accordance with a third embodiment of the invention, a gas turbine engine is disclosed as including: a fan section at a forward end of the gas turbine engine including at least a first fan blade row connected to a drive shaft; a booster compressor positioned downstream of the fan section, where the booster compressor includes a first compressor blade row and a second compressor blade row connected to the drive shaft and interdigitated with the first compressor blade row; and, a pulse detonation system for powering the drive shaft. The pulse detonation system further includes: a rotatable cylindrical member having a forward surface, an aft surface, and an outer circumferential surface, with the cylindrical member including at least one stage of circumferentially spaced detonation chambers disposed therein and the cylindrical member being connected to the drive shaft; and, a stator configured in spaced arrangement around the forward surface, the aft surface, and the outer circumferential surface of the cylindrical member and a portion of the shaft, with the stator including at least one group of ports formed therein which sequentially align with the detonation chambers as the cylindrical member rotates. In this way, detonation cycles are performed in the detonation chambers of each detonation stage so that reaction forces induced by the detonation cycles create a torque which causes the cylindrical member to rotate and power the fan section and the booster compressor. Each detonation chamber further includes a first open end located adjacent the outer circumferential surface of the cylindrical member and a second closed end located within a middle portion of the cylindrical member. Each group of ports in the stator further includes an air port in flow communication with a source of compressed air, a fuel port in flow communication with a fuel source, and an exhaust port. The booster compressor may have separate portions which provide separate compressed air flows into different areas of the pulse detonation system. Otherwise, the pulse detonation system may receive a compressed air flow from the booster compressor and bleed air from the bypass air flow.

In accordance with a fourth embodiment of the present invention, a gas turbine engine is disclosed as including: a bellmouth at a forward end of the gas turbine engine; a compressor positioned downstream of and in flow communication with the bellmouth, where the compressor includes a first compressor blade row and a second blade row connected to a drive shaft and interdigitated with the first compressor blade row; a load connected to the drive shaft; and, a pulse detonation system for powering the drive shaft. The pulse detonation system further includes: a rotatable cylindrical member having a forward surface, an aft surface, and an outer circumferential surface, with the cylindrical member including at least one stage of circumferentially spaced detonation chambers disposed therein and being connected to the drive shaft; and, a stator configured in spaced arrangement around the forward surface, the aft surface, and the outer circumferential surface of the cylindrical member and a portion of the shaft, with the stator including at least one group of ports formed therein which sequentially align with the detonation chambers as the cylindrical member rotates. In this way, detonation cycles are performed in the detonation chambers of each detonation stage so that reaction forces induced by the detonation cycles create a torque which causes the cylindrical member to rotate and power the compressor and the load. Each detonation chamber includes a first open end located adjacent the outer circumferential surface of the cylindrical member and a second closed end located within a middle portion of the cylindrical member. Each group of ports in the stator further include an air port in flow communication with a source of compressed air, a fuel port in flow communication with a fuel source, and an exhaust port.

DETAILED DESCRIPTION OF THE INVENTION

Figure 1:
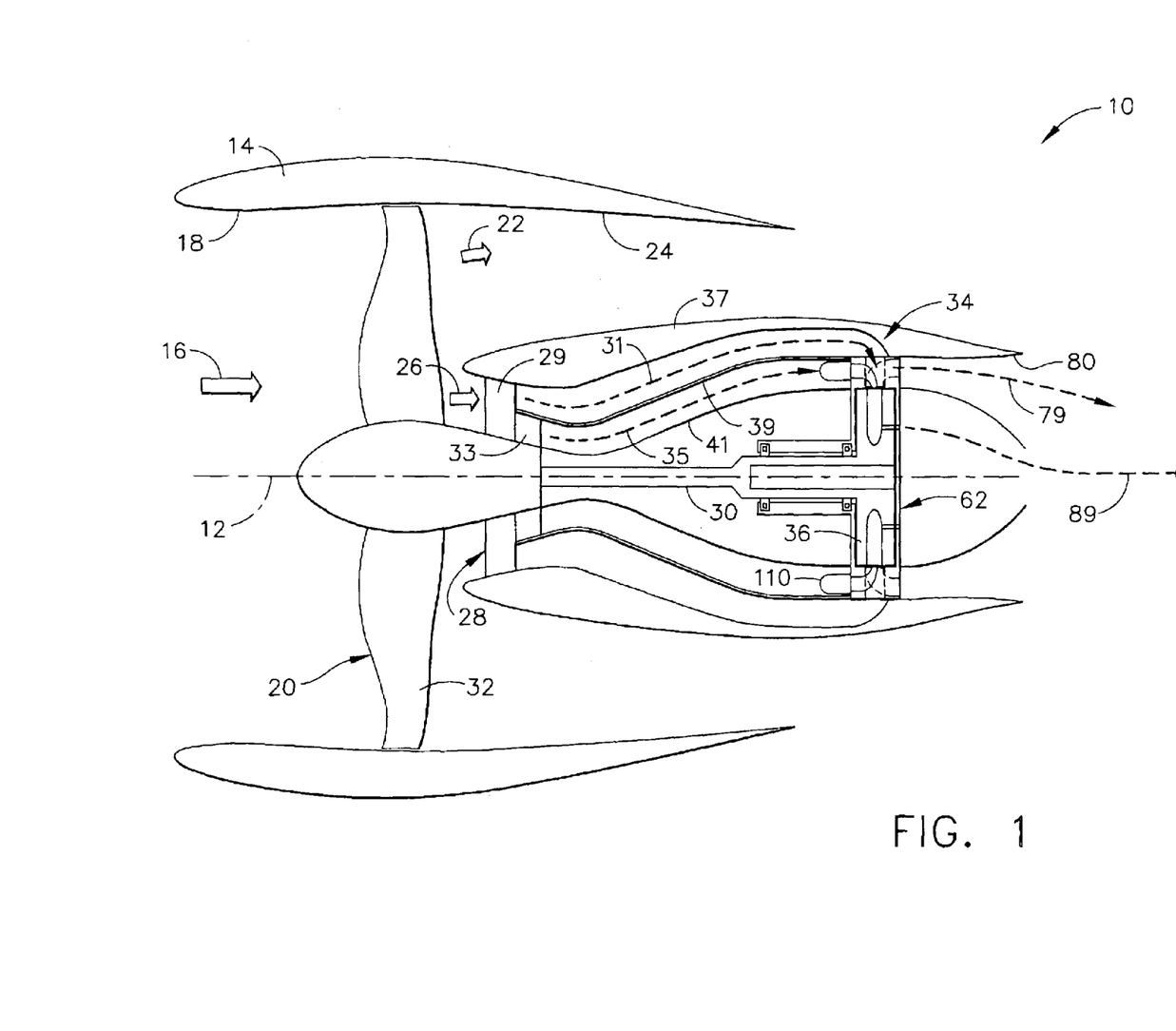
FIG. 1 is a longitudinal schematic sectional view of a first gas turbine engine configuration including a pulse detonation system in accordance with the present invention.

Referring now to the drawings in detail, wherein identical numerals indicate the same elements throughout the figures, FIG. 1 schematically depicts an exemplary gas turbine engine 10 (high bypass type) utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a booster compressor 28.

In the high bypass configuration depicted, it will be understood that booster compressor 28 preferably includes a first (outer) portion 29 which provides a first compressed air flow 31 and a second (inner) portion 33 which provides a second compressed air flow 35. First compressed air flow 31 is bounded by an inner bypass platform 37 and a duct member 39, while second compressed air flow 35 is bounded by duct member 39 and a rotatable hub 41. It will be noted that first and second booster compressor portions 29 and 33 preferably each include at least one compressor stage with a stationary compressor blade row and a compressor blade row connected to a drive shaft 30 and interdigitated with the stationary compressor blade row associated with each compressor stage. It will be appreciated that additional booster compressor stages may be provided in either portion as desired. As described in greater detail herein, first compressed air flow 31 and second compressed air flow 35 are utilized for different purposes, with the pressure of second compressed air flow 35 preferably being approximately 1.5–3.0 times greater than that of first compressed air flow 31. A first fan blade row 32 is also preferably connected to drive shaft 30.

Figures 2, 3:
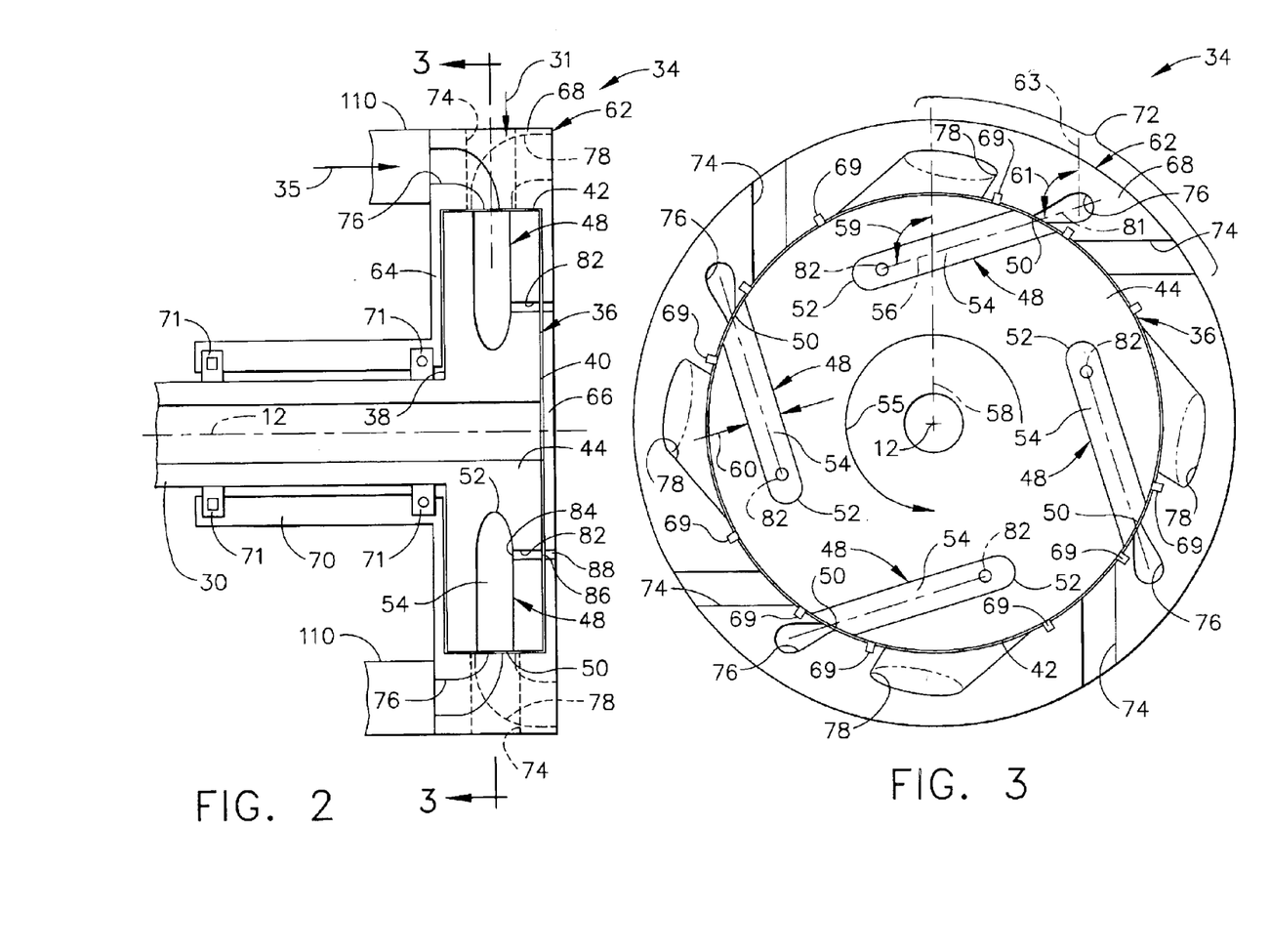
FIG. 2 is an enlarged, partial longitudinal schematic sectional view of the gas turbine engine depicted in FIG. 1, wherein the pulse detonation system is shown in greater detail.
FIG. 3 is a schematic sectional view of the pulse detonation system taken along lines 3—3 in FIG. 2.

Drive shaft 30 is preferably powered by means of a pulse detonation system 34 in accordance with the present invention. More specifically, pulse detonation system 34 includes a rotatable cylindrical member 36 having a forward surface 38, an aft surface 40, an outer circumferential surface 42 and a middle portion 44. Cylindrical member 36 further includes at least one stage 46 of detonation chambers 48 disposed therein. Each detonation chamber 48 is formed to include a first end 50 which is located adjacent to outer circumferential surface 42 so as to be open or in flow communication therewith, a second or closed end 52 located within middle portion 44, and a middle section 54 extending between first and second ends 50 and 52.

It is further preferred that detonation chambers 48 of each detonation stage 46 be symmetrically spaced circumferentially within cylindrical member 36. Detonation chambers 48 are oriented so as to not be radial or substantially perpendicular to longitudinal axis 12. Rather, detonation chambers 48 preferably extend into middle portion 44 of cylindrical member 36 so as to be substantially tangential to outer circumferential surface 42. This orientation is also represented by a circumferential angle 59 between a longitudinal axis 56 through detonation chambers 48 and an axis 58 that is perpendicular (radial) to longitudinal centerline axis 12 (see FIG. 3). Such angle 59 is preferably acute since detonation chambers 48 are preferably tilted in the direction of rotation (indicated by arrow 55) for cylindrical member 36. The number of detonation chambers 48 provided within cylindrical member 36 is dependent upon several factors, including the length of each detonation chamber, the diameter of cylindrical member 36, and angle 59.

It will be appreciated that second end 52 of each detonation chamber 48 includes an end wall 53 which is preferably contoured for the reasons explained herein. Each detonation chamber 48 preferably has a substantially circular cross-section throughout the length of at least middle section 54, although such cross-section may also be non-circular. Further, each detonation chamber 48 is preferably linear and has a substantially constant diameter 60 throughout middle section 54. It is possible, however, that detonation chambers 48 may be configured to be curved for at least a portion thereof and/or that diameter 60 of middle section 54 is convergent for at least a portion thereof.

Pulse detonation system 34 further includes a stator 62 which is configured in spaced arrangement around forward surface 38, aft surface 40 and outer circumferential surface 42 of cylindrical member 36, as well as a portion of drive shaft 30. Accordingly, stator 62 includes a forward portion 64, an aft portion 66, a circumferential portion 68, and a shaft portion 70. A plurality of seals 69 are preferably circumferentially spaced and positioned between outer circumferential surface 42 of cylindrical member 36 and circumferential portion 68 of stator 62 so as to prevent flow between ports. Drive shaft 30 is also mounted to shaft portion 70 of stator 62 by means of a plurality of bearings 71 so as to permit the rotation of drive shaft 30 with respect to stator 62.

Stator 62 further includes at least one group of ports 72 formed in circumferential portion 68. It will be understood that each port group 72 has an air port 74 in flow communication with a source of compressed air (e.g., first compressed air flow 31 from booster compressor 28), a fuel port 76 in flow communication with a fuel source, and an exhaust port 78 in flow communication with an exhaust nozzle 80 downstream of cylindrical member 36 (see air flow 79 in FIG. 1).

It will be seen that air port 74, fuel port 76 and exhaust port 78 of each port group 72 are preferably oriented in circumferential portion 68 of stator 62 in the same manner as detonation chambers 48 described hereinabove so that they are alignable with each detonation chamber in a predetermined timing and sequence as cylindrical member 36 rotates. Thus, an angle 61 between a longitudinal axis 81 through such ports and an axis 63 substantially parallel to axis 58 is likewise acute and substantially the same as angle 59. In this way, detonation cycles are able to be performed in detonation chambers 48 of each detonation stage 46 so that reaction forces induced by such detonation cycles create a torque that causes cylindrical member 36 to rotate.

Cylindrical member 36 also preferably includes a plurality of circumferentially spaced ports 82 formed in middle portion 44 which have a first end 84 positioned adjacent second end 52 of each detonation chamber 48 and in flow communication therewith. Ports 82 extend from first end 84 to a second end 86 which is adjacent to cylindrical member aft surface 40. Stator aft portion 66 likewise includes at least one, and preferably a plurality, of circumferentially spaced ports 88 formed therein so that ports 82 are periodically aligned therewith and gases in detonation chambers 48 are vented therethrough (see air flow 89 in FIG. 1).

Figure 4A:
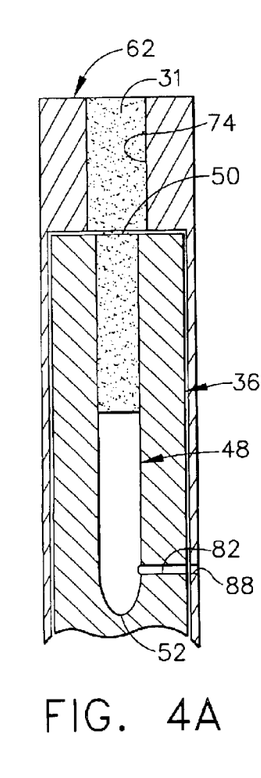
FIGS. 4A–4E are a diagrammatic view of a detonation chamber for the pulse detonation system depicted in FIGS. 2 and 3 undergoing a specified sequence of events in a first type of detonation cycle.
Figure 4B:
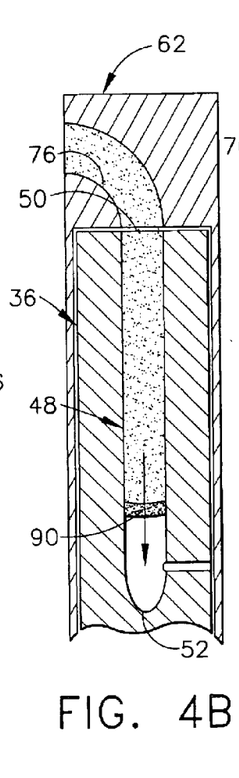
Figure 4C:
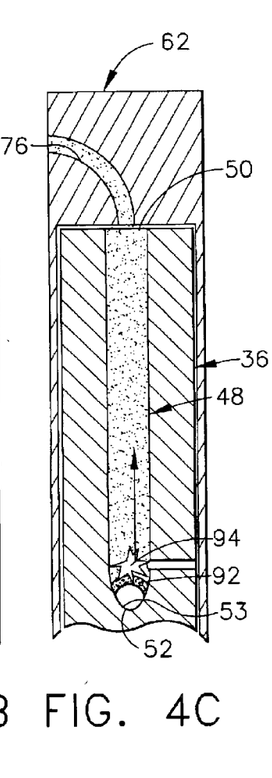
Figure 4D:
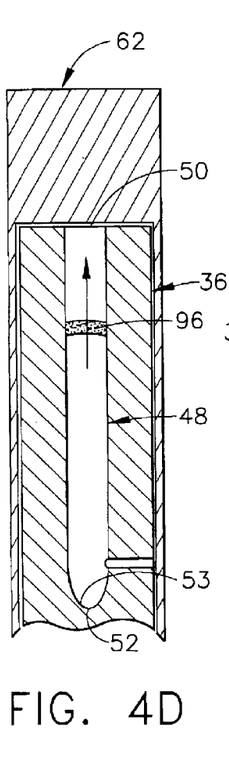
Figure 4E:
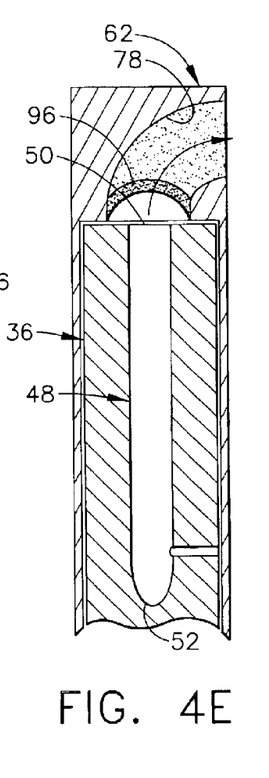

With respect to the detonation cycle performed in each detonation chamber 48, FIGS. 4A–4E represent a preferred sequence of events which takes place according to a predetermined timing. In FIG. 4A, detonation chamber 48 is preferably filled with compressed air from air port 74, which also serves to purge remaining combustion products from the previous detonation cycle. Thus, ports 82 and 88 will preferably be aligned for at least a portion of this step. Next, FIG. 4B depicts the injection of fuel in detonation chamber 48 via fuel port 76. While the fuel may be in the form of atomized liquid fuel, gaseous fuel or the products of partial combustion of a liquid fuel, the delivery pressure is preferably high enough to create an initial shock wave 90 in detonation chamber 48. As seen in FIG. 4C, initial shock wave 90 travels to closed end 52 of detonation chamber 48, where it is reflected and focused by the contours of end wall 53 defining closed end 52 so that a focused shock wave 92 is formed. This focused shock wave 92 then preferably initiates detonation of the fuel/air mixture in detonation chamber 48 at an initiation point 94 so that a detonation wave 96 is formed. It will be understood that detonation wave 96 travels toward open end 50 of detonation chamber 48 (see FIG. 4D). Accordingly, reaction forces induced by the detonation create a torque on cylindrical member 36 once open end 50 of detonation chamber 48 aligns with exhaust port 78 as shown in FIG. 4E. It will also be appreciated that detonation wave 96 exits via exhaust port 78 and the combustion products following such detonation wave 96 are exhausted therethrough. By the addition of more fuel, the impulse or induced reaction forces of each detonation increases with a corresponding increase in torque on cylindrical member 36. At some point, useful power is then available from pulse detonation system 34.

It will be appreciated that prior to the occurrence of any detonation cycles within detonation chambers 48, cylindrical member 36 is preferably driven so as to obtain a predetermined rotational speed. This is caused by supplying compressed air to detonation chambers 48 via air ports 74 at a relatively higher pressure than the pressure at which air is discharged from detonation chambers 48 through exhaust ports 78. Once the predetermined rotational speed of cylindrical member 36 is achieved, fuel is then supplied to detonation chambers 48 in accordance with the detonation cycle described hereinabove.

Figure 5:
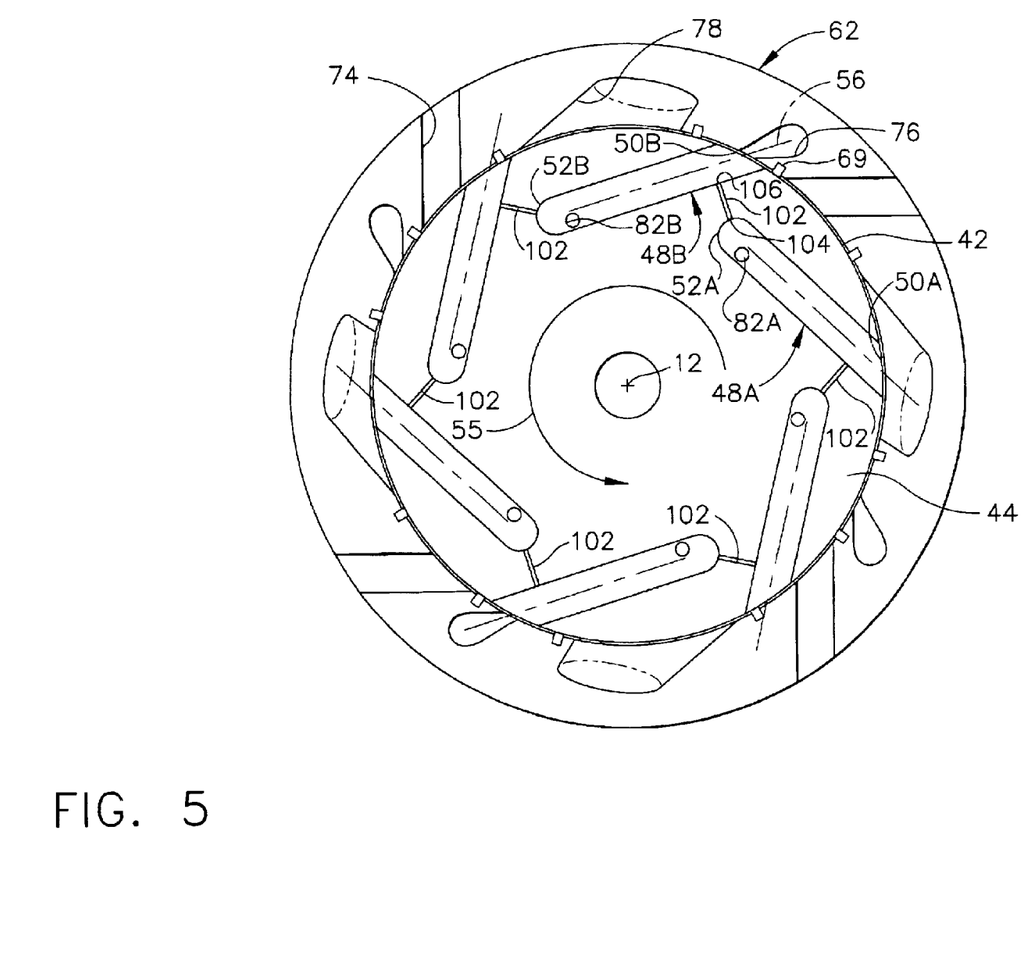
FIG. 5 is a schematic sectional view similar to the view depicted in FIG. 3 of a first alternative embodiment for the pulse detonation system.
Figure 9:
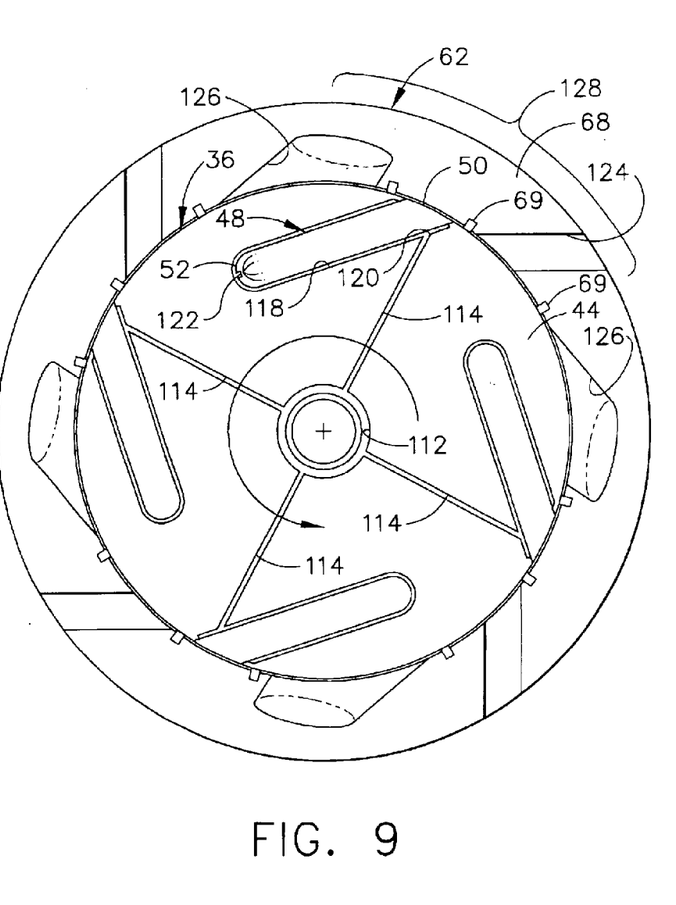
FIG. 9 is a schematic sectional view of the pulse detonation system taken along lines 9—9 in FIG. 8.

It will be appreciated that a plurality of port groups 72 may be provided in circumferential portion 68 of stator 62, wherein a plurality of detonation cycles are able to occur in each detonation chamber 48 of detonation stage 46 during a revolution of cylindrical member 36. Such port groups 72 are preferably spaced symmetrically around stator 62, although it is not required. Moreover, while the number of port groups 72 may be equivalent to the number of detonation chambers 48 provided in cylindrical member 36 (see FIGS. 3 and 9), there may be less (see FIGS. 5 and 11). In any event a predetermined amount of circumferential space is provided between each port group 72, as well as between each individual port thereof.

Figure 10:
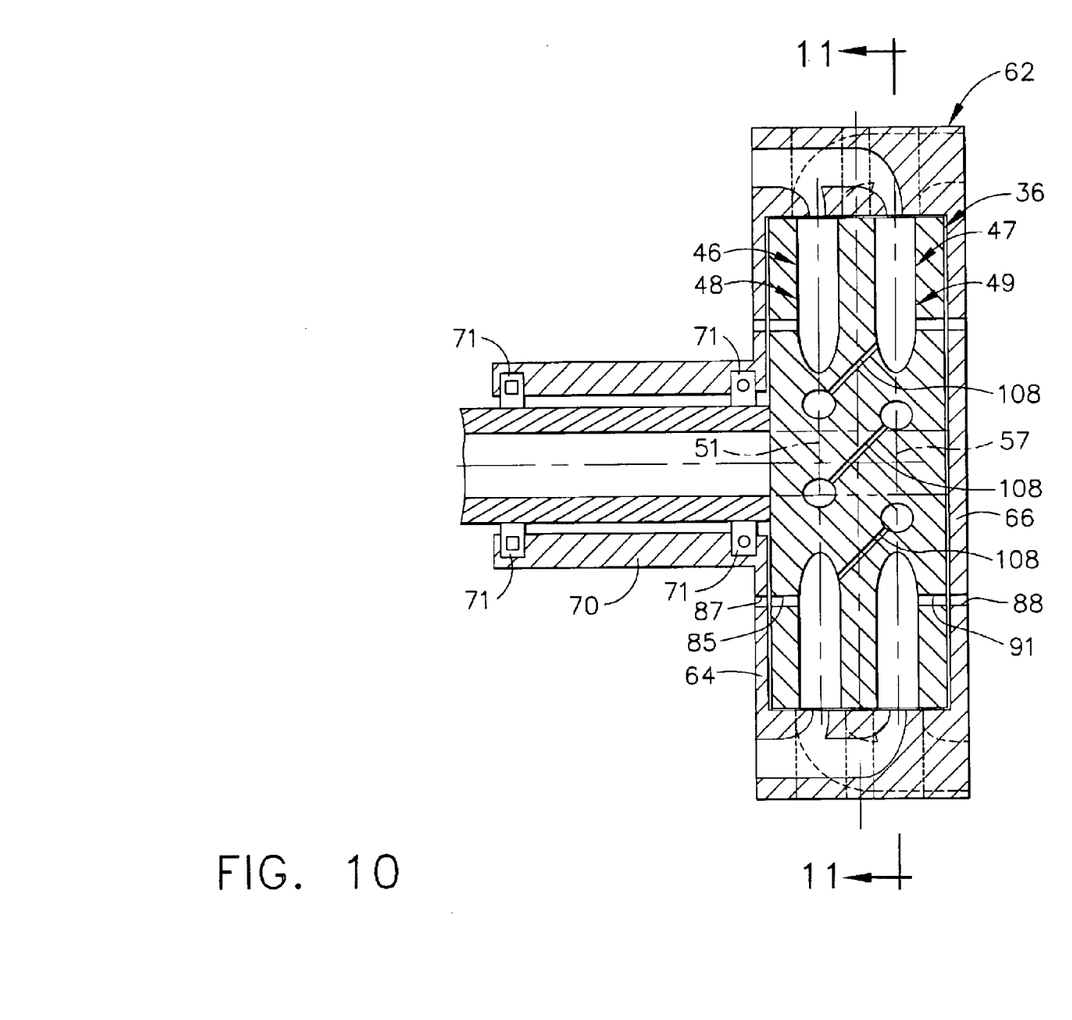
FIG. 10 is an enlarged, partial longitudinal schematic sectional view of the gas turbine engine similar to the views depicted in FIGS. 2, 6 and 8, wherein a fourth alternative embodiment for the pulse detonation system is shown in greater detail.

It will be understood from FIG. 10 that cylindrical member 36 may include a plurality of detonation stages 46 and 47 positioned in spaced axial relation. Detonation chambers 48 (for detonation stage 46) and detonation chambers 49 (for detonation stage 47) are preferably positioned in a distinct radial plane (identified by reference numerals 51 and 57, respectively) through cylindrical member 36, and may be aligned substantially circumferentially or staggered circumferentially. In either event, an additional stage of port groups will be provided in circumferential portion 68 of stator 62 so as to supply fuel and air to both detonation chambers 48 and 49, as well as exhaust combustion products therefrom. It will also be noted that ports 87 would preferably be provided in forward stator portion 64 to permit venting of detonation chambers 48 through cylindrical member ports 85. Similarly, detonation chambers 49 are vented via ports 91 and 88.

Figure 6:
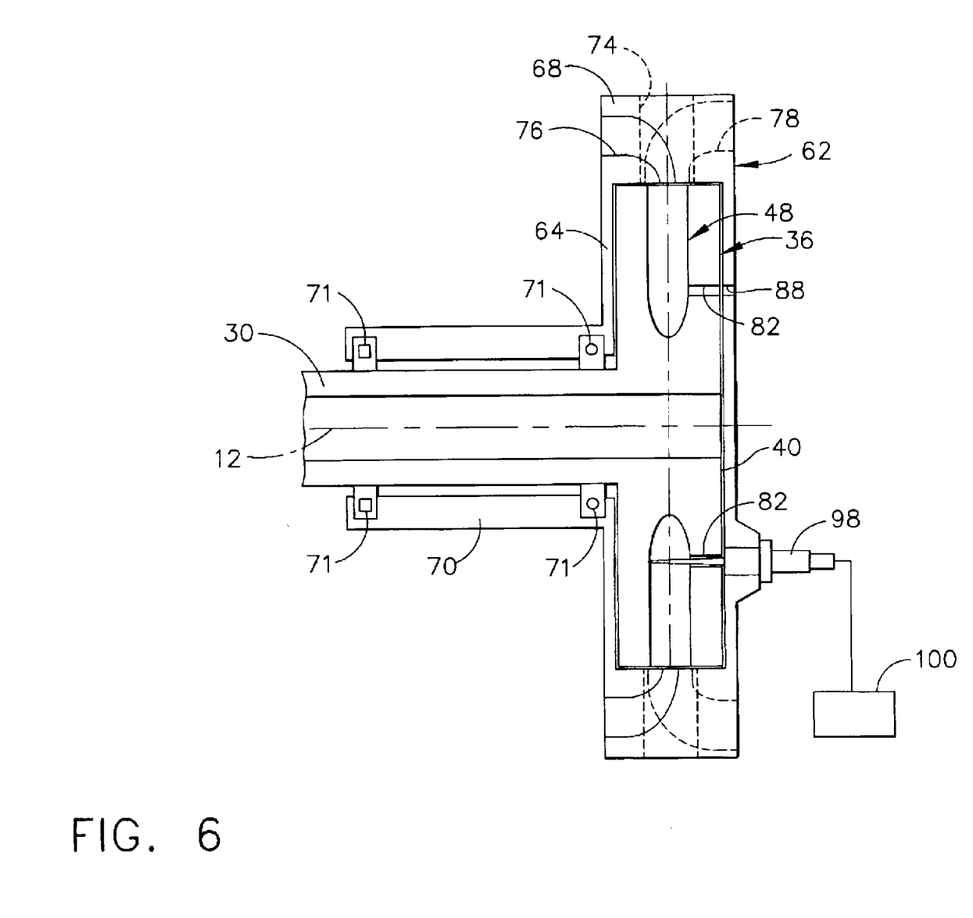
FIG. 6 is an enlarged, partial longitudinal schematic sectional view of the gas turbine engine similar to the view depicted in FIG. 2, wherein a second alternative embodiment for the pulse detonation system is shown in greater detail.

As an alternative or supplement to the shock focusing detonation technique described above, it is contemplated that a device 98 for initiating a detonation be positioned adjacent aft surface 40 of cylindrical member 36 so that each port 82 is periodically aligned therewith (see FIG. 6). Exemplary initiation devices may include an igniter (e.g., a high energy spark plug, a torch igniter having separate fuel and oxidizer, or a plasma jet igniter), a laser, or a shock focus device. Initiation device 98 may be activated when in alignment with each port 82 so as to assist in producing a detonation wave in all detonation chambers 48 or in accordance with a predetermined delay so that only certain ports 82 of detonation chambers 48 are utilized for this purpose. A control device 100 is preferably provided to control the initiation of detonations within detonation chambers 48 of each detonation stage 46.

Figure 7A:
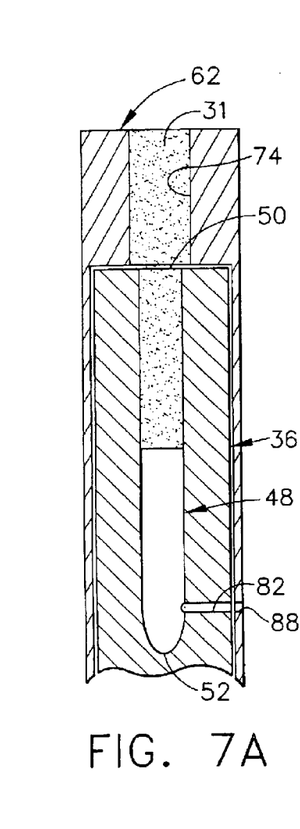
FIGS. 7A–7E are a diagrammatic view of a detonation chamber for the pulse detonation system depicted in FIG. 6 undergoing a specified sequence of events in an alternative detonation cycle.
Figure 7B:
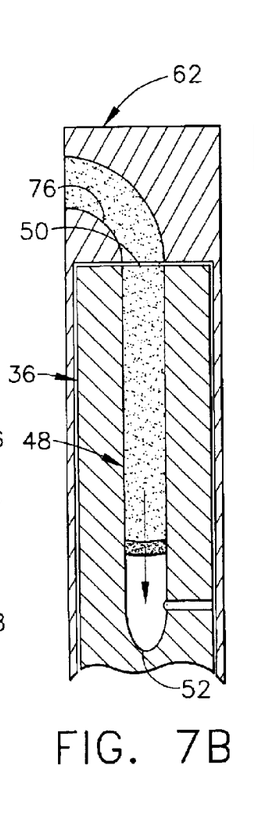
Figure 7C:
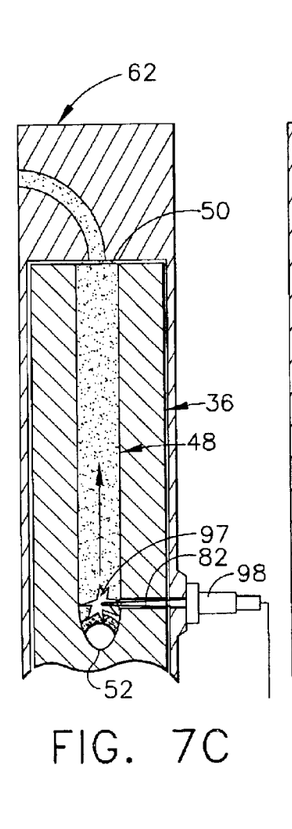
Figure 7D:
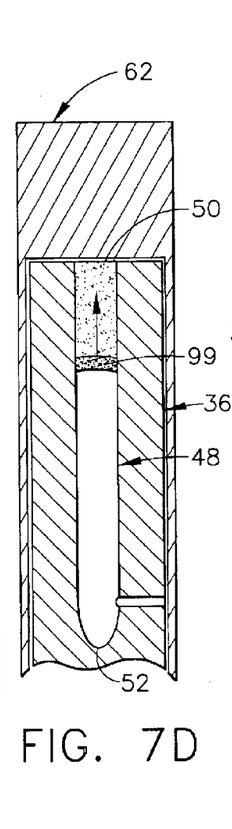
Figure 7E:
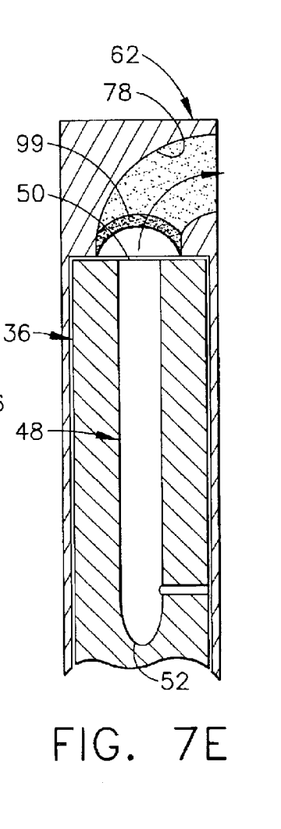

When initiation device 98 is utilized, the detonation cycle in detonation chambers 48 is somewhat different than that previously described, as represented in FIGS. 7A–7E. In FIG. 7A, detonation chamber 48 is preferably filled with compressed air from air port 74, which also serves to purge remaining combustion products from the previous detonation cycle. Thus, ports 82 and 88 will preferably be aligned for at least a portion of this step. Next, FIG. 7B depicts the injection of fuel in detonation chamber 48 via fuel port 76. As seen in FIG. 7C, device 98 preferably initiates detonation of the fuel/air mixture in detonation chamber 48 at an initiation point 97 so that a detonation wave 99 is formed. It will be understood that device 98 is able to access detonation chamber 48 via ports 82. Detonation wave 99 then travels toward open end 50 of detonation chamber 48 (see FIG. 7D). Accordingly, reaction forces induced by the detonation create a torque on cylindrical member 36 once open end 50 of detonation chamber 48 aligns with exhaust port 78 as shown in FIG. 7E. Detonation wave 99 also exits via exhaust port 78 and the combustion products following such detonation wave 99 exhaust therethrough.

Figure 11:
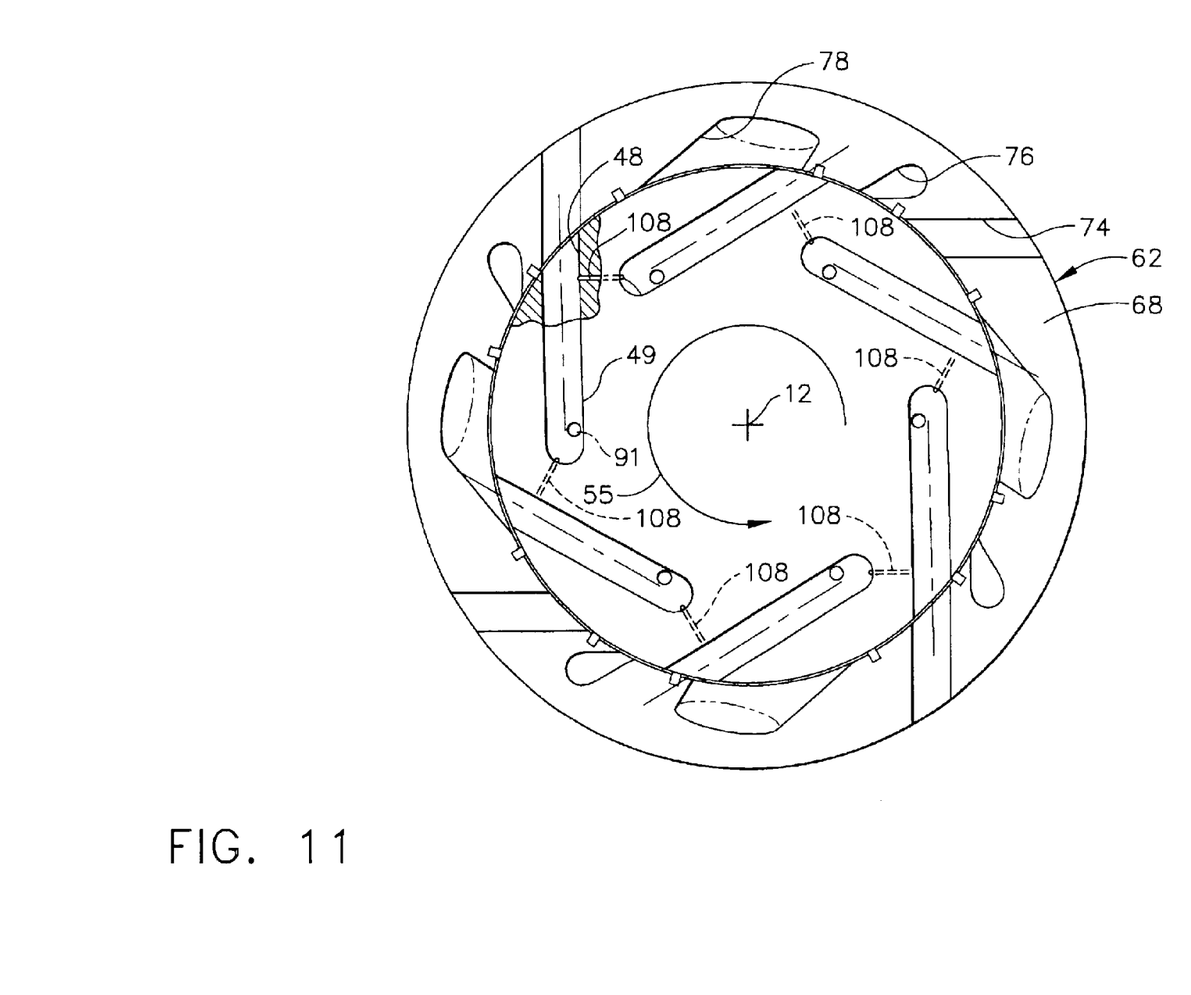
FIG. 11 is a schematic sectional view of the pulse detonation system taken along lines 11—11 in FIG. 10, wherein a portion has been broken away for clarity.

Another configuration for assisting in the production of detonation waves within detonation chambers 48 is to provide a series of internal passages 102 within cylindrical member 36 which connect adjacent detonation chambers 48. It will be seen from FIG. 5 that each internal passage 102 includes a first end 104 in flow communication with a first detonation chamber 48A (preferably adjacent second end 52A thereof) and a second end 106 in flow communication with a second detonation chamber 48B (preferably adjacent first end 50B thereof). It will be appreciated that first detonation chamber 48A is located upstream of second detonation chamber 48B with respect to the direction of rotation of cylindrical member 36, where first detonation chamber 48A is located in substantial alignment with an exhaust port 78 and second detonation chamber 48B is located in alignment with fuel port 76. In this way, combustion products remaining from a detonation within first detonation chamber 48A are provided to second detonation chamber 48B. While internal passages 102 are shown as connecting circumferentially adjacent detonation chambers 48 in the same detonation stage 46, this need not be so. Such internal passages 102 may connect any two detonation chambers 48, so long as it has one end positioned adjacent the closed end of a first detonation chamber and another end positioned adjacent the open end of a second detonation chamber. Also, as seen in FIGS. 10 and 11, a series of internal passages 108 may be used to similarly connect detonation chambers 48 of detonation stage 46 with detonation chambers 49 of detonation stage 47.

Another aspect of pulse detonation system 34 is the manner in which fuel is supplied to fuel ports 76 for injection into detonation chambers 48. In one embodiment, a substantially annular precombustor 110 is provided upstream of stator 62 (see FIGS. 1 and 2). Precombustor 110 is preferably in flow communication with a fuel supply (not shown) and second compressed air flow 35 from booster compressor 28, where fuel and compressed air are mixed within precombustor 110 to produce detonable combustion products. Precombustor 110 is also in flow communication with fuel ports 76 so that the detonable combustion products are supplied therethrough as part of the detonation cycle in detonation chambers 48 described herein. This configuration is effective for providing a gaseous fuel to detonation chambers 48.

Figure 8:
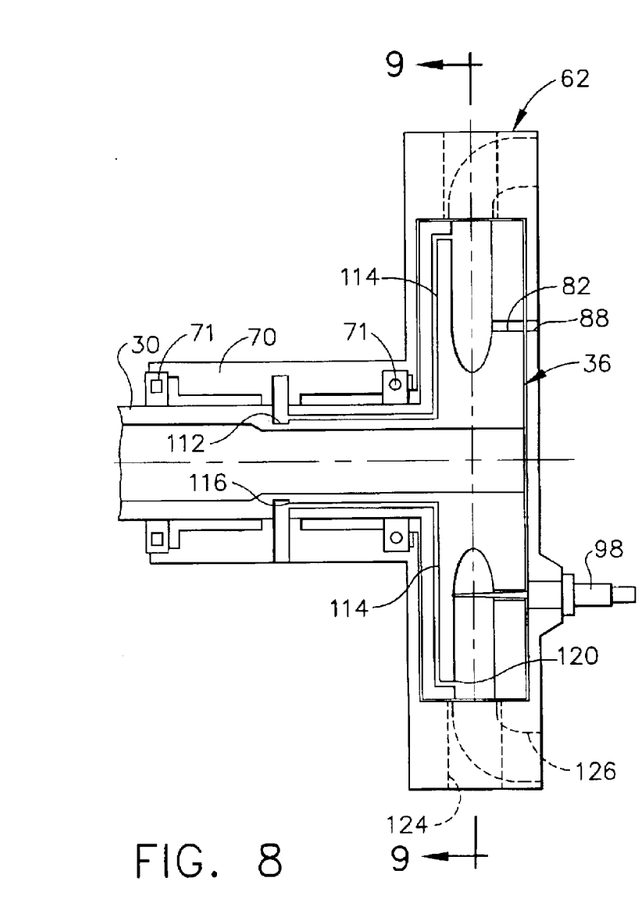
FIG. 8 is an enlarged, partial longitudinal schematic sectional view of the gas turbine engine similar to the views depicted in FIGS. 2 and 6, wherein a third alternative embodiment for the pulse detonation system is shown in greater detail.

While an annular manifold (not shown) upstream of or surrounding stator 62 may likewise provide liquid fuel to fuel ports 76, FIG. 8 depicts a configuration whereby a fuel manifold 112 formed in drive shaft 30 and stator shaft portion 70 is in flow communication with a fuel source. A plurality of fuel passages 114 are then formed within middle portion 44 of cylindrical member 36 which are in flow communication with fuel manifold 112 at a first end 116. A heat exchanger, preferably in the form of an unfilled tube 118, is preferably provided around each detonation chamber 48. A second end 120 of each fuel passage 114 is preferably in flow communication with such heat exchanger so that the fuel injected therein assists in cooling detonation chambers 48. At the same time, heat from the detonation chambers 48 assist in heating the fuel supplied to tubes 118. It is then preferred that the heated fuel be injected into each detonation chamber 48 adjacent closed end 52 thereof by means of injectors 122. It will be appreciated that the fuel provided to detonation chambers 48 may undergo a change of state (i.e., from liquid to gas) during this process. In this embodiment, it will be understood that only an air port 124 and an exhaust port 126 are required for each port group 128 formed in circumferential portion 68 of stator 62 and that fuel will be injected into each detonation chamber 48 only when it is not aligned with any such ports 124 and 126. It is also contemplated that fuel could be supplied directly from fuel manifold 112 to detonation chambers 48 via fuel passages 114 (as depicted in FIG. 8).

Figure 12:
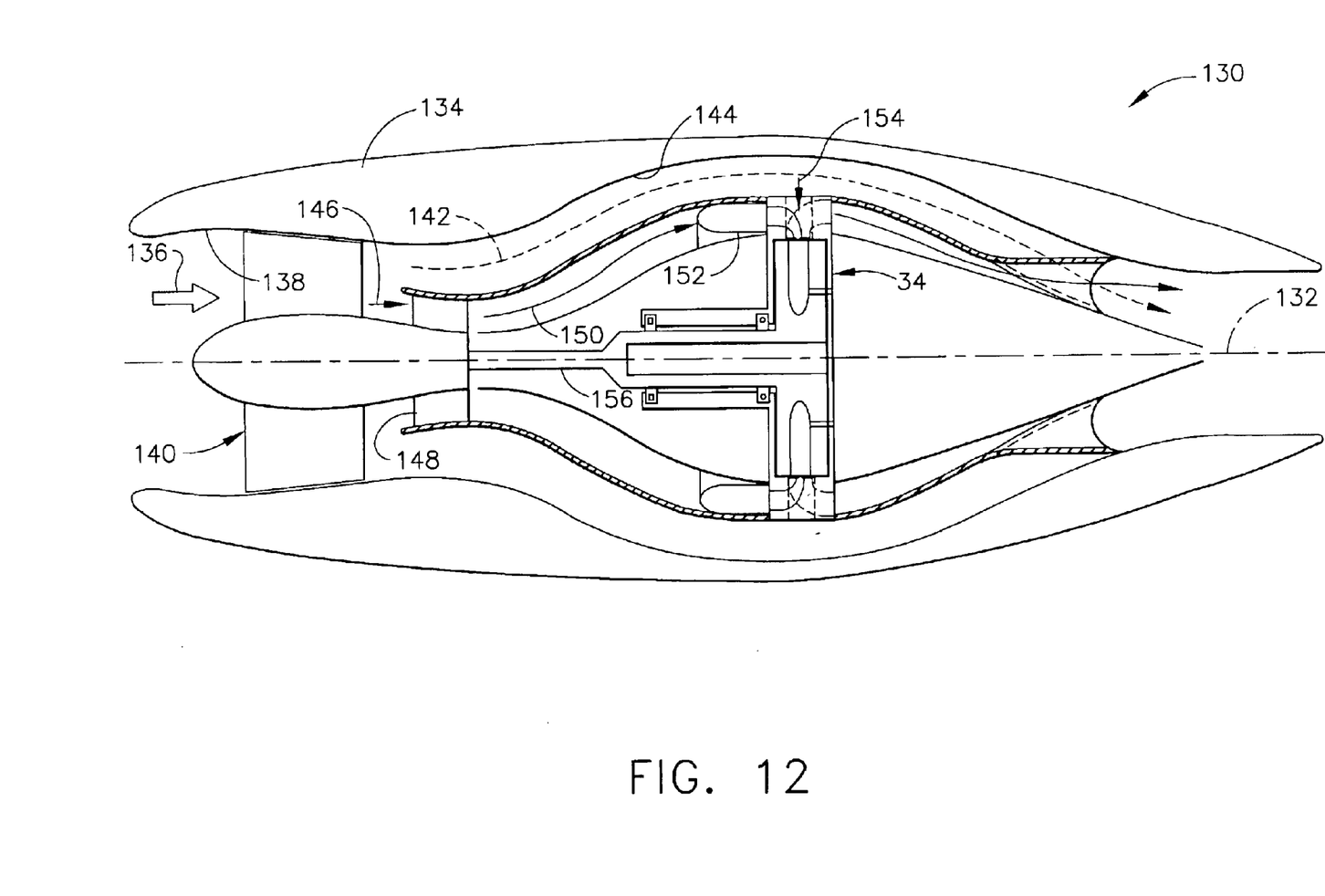
FIG. 12 is a longitudinal schematic sectional view of a second gas turbine engine configuration including a pulse detonation system in accordance with the present invention; and, FIG. 13 is a longitudinal schematic sectional view of a third gas turbine engine configuration including a pulse detonation system in accordance with the present invention.

A second gas turbine configuration, known as a low bypass design, is shown in FIG. 12 as including pulse detonation system 34. While similar to that described for gas turbine engine 10, it will be understood that gas turbine engine 130 is utilized with aircraft and has a longitudinal or axial centerline axis 132 therethrough for reference purposes. Gas turbine engine 130 includes a nacelle 134 to assist in directing a flow of air (represented by arrow 136) through an inlet 138 to a fan section 140 as is known. Air flow 136 is then split downstream of fan section 140 so that a first portion (represented by arrow 142) flows through an outer duct 144 and a second portion (represented by arrow 146) is provided to a booster compressor 148.

In the low bypass configuration depicted, it will be understood that booster compressor 148 provides a compressed air flow 150 to a precombustor 152 upstream of pulse detonation system 34. Meanwhile, air 154 is also bled from air flow 142 and preferably provided to the air ports 74 of pulse detonation system 34. Booster compressor 148 preferably includes at least one compressor stage with a stationary compressor blade row and a compressor blade row connected to a drive shaft 156 and interdigitated with the stationary compressor blade row associated with each compressor stage. It will be appreciated that additional booster compressor stages may be provided as desired. Since compressed air flow 150 and bleed air 154 are utilized for different purposes, the pressure of compressed air flow 150 is preferably approximately 1.5–3.0 times greater than that of bleed air 154. Other than changes to booster compressor 148 and the flow of air therethrough, gas turbine engine 130 is similar to gas turbine engine 10 with respect to the operation and use of pulse detonation system 34.

Figure 13:
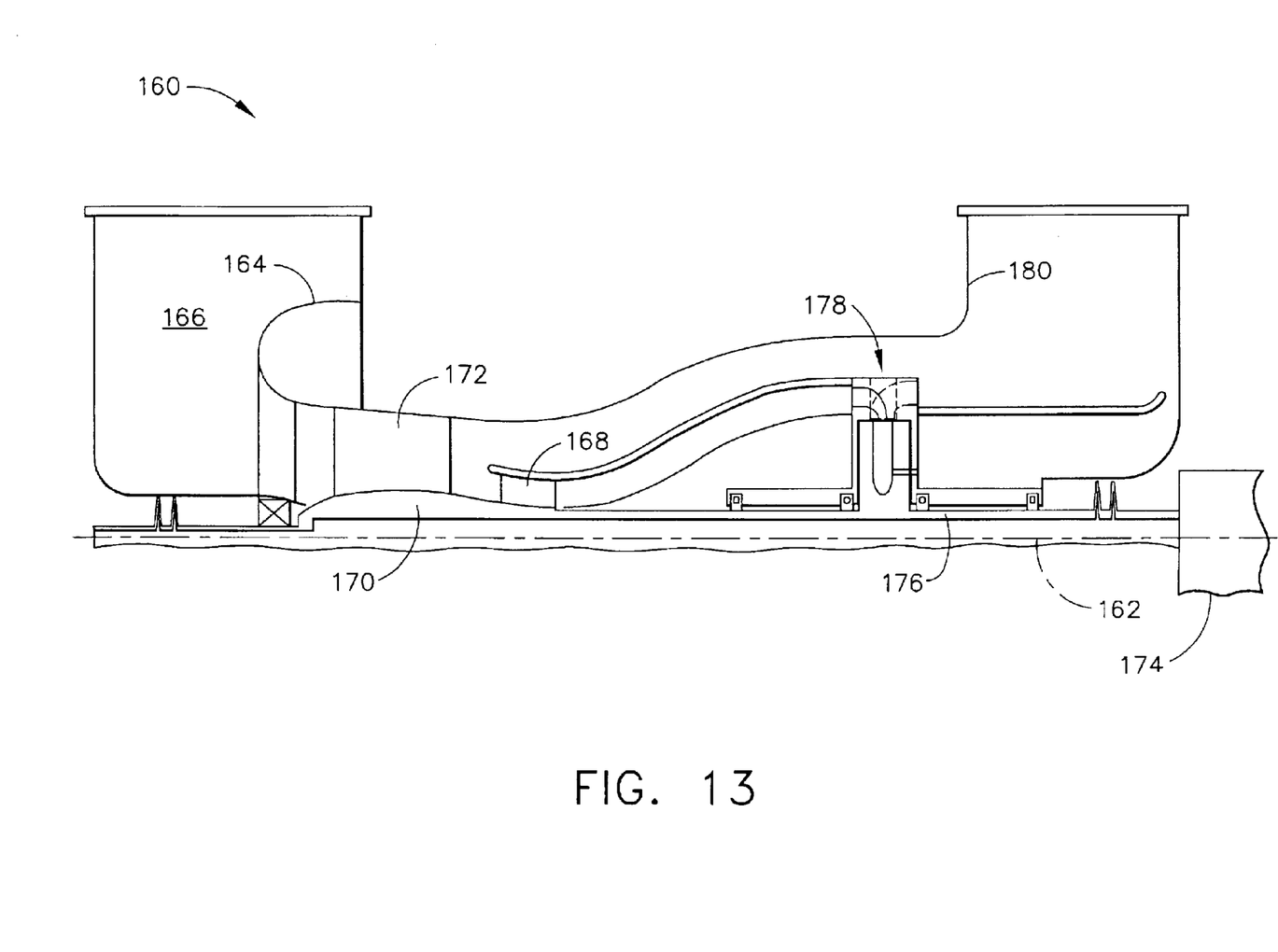

It will be seen in FIG. 13 that a second alternative gas turbine engine 160 is depicted for use in industrial and other shaft power applications (e.g., marine or helicopter propulsion) as having a longitudinal centerline axis 162. As seen therein, gas turbine engine 160 includes a bellmouth 164 at an inlet 166 and a compressor 168 positioned downstream of and in flow communication with bellmouth 164. Compressor 168 preferably includes at least a first stationary compressor blade row connected to a drive shaft 170 and a second stationary compressor blade row interdigitated with first compressor blade row. Additional compressor blade rows may be connected to drive shaft 170, with additional stationary compressor blade rows interdigitated therewith.

An inlet guide vane 172 may be positioned at an upstream end of compressor 168 to direct the flow of air therein. A load 174 is also connected to drive shaft 170 via a second drive shaft 176. A pulse detonation system 178 like that described hereinabove is provided for powering drive shaft 170, with an exhaust duct 180 being in flow communication with pulse detonation system 178 so that combustion gases are able to exit therefrom.

Having shown and described the preferred embodiment of the present invention, further adaptations of the pulse detonation system can be accomplished by appropriate modifications by one of ordinary skill in the art without departing from the scope of the invention. Moreover, it will be understood that pulse detonation system 34 may be utilized with other types of gas turbine engines not depicted herein.

What is claimed is:

1. A pulse detonation system for a gas turbine engine having a longitudinal centerline axis extending therethrough, comprising:
    (a) a rotatable cylindrical member having a forward surface, an aft surface, and an outer circumferential surface, said cylindrical member including at least one stage of circumferentially spaced detonation chambers disposed therein, each said detonation chamber including an open first end located adjacent said outer circumferential surface of said cylindrical member and a closed second end located within a middle portion of said cylindrical member;
    (b) a shaft rotatably connected to said cylindrical member; and,
    (c) a stator configured in spaced arrangement around said forward surface, said aft surface, and said outer circumferential surface of said cylindrical member and a portion of said shaft, said stator including at least one group of ports formed therein which sequentially align with said open end of said detonation chambers as said cylindrical member rotates;
wherein detonation cycles are performed in said detonation chambers of each detonation stage so that reaction forces induced by said detonation cycles create a torque which causes said cylindrical member to rotate.

2. The pulse detonation system of claim 1, wherein a focused shock wave is formed in said detonation chambers to initiate detonation of a fuel/air mixture therein.

3. The pulse detonation system of claim 2, wherein said detonations have an initiation point adjacent said second end of each said detonation chamber.

4. The pulse detonation system of claim 1, wherein an end wall defining said second end of each said detonation chamber is contoured.

5. The pulse detonation system of claim 1, each said group of ports in said stator further comprising an air port in flow communication with a source of compressed air.

6. The pulse detonation system of claim 1, each said group of ports in said stator further comprising a fuel port in flow communication with a fuel source.

7. The pulse detonation system of claim 1, each said group of ports in said stator further comprising an exhaust port.

8. The pulse detonation system of claim 1, further comprising a plurality of port groups provided in said stator, wherein a plurality of detonation cycles occur in a predetermined timing and sequence in each said detonation stage during a revolution of said cylindrical member.

9. The pulse detonation system of claim 1, wherein said detonation chambers of each detonation stage are symmetrically spaced circumferentially within said rotor.

10. The pulse detonation system of claim 1, said cylindrical member further comprising a plurality of internal passages formed therein, each said internal passage including a first end in flow communication with a first detonation chamber and a second end in flow communication with a second detonation chamber.

11. The pulse detonation system of claim 10, wherein said first end of each said internal passage is located adjacent a closed end of said first detonation chamber and said second end of each said internal passage is located adjacent an open end of said second detonation chamber.

12. The pulse detonation system of claim 11, wherein said first detonation chamber is located upstream of said second detonation chamber with respect to the direction of rotation for said rotor.

13. The pulse detonation system of claim 10, wherein said first and second detonation chambers are in the same detonation stage.

14. The pulse detonation system of claim 10, wherein said first and second detonation chambers are in adjacent detonation stages of said cylindrical member.

15. The pulse detonation system of claim 1, wherein said detonation chambers of each said detonation stage are positioned substantially in a distinct radial plane through said cylindrical member.

16. The pulse detonation system of claim 1, wherein said plurality of detonation chambers of each said detonation stage are angled circumferentially so as to not be substantially perpendicular to said longitudinal centerline axis.

17. The pulse detonation system of claim 16, wherein said port groups in said stator are angled circumferentially so as to be alignable with said detonation chambers.

18. The pulse detonation system of claim 1, said cylindrical member further comprising a plurality of detonation stages positioned in spaced axial relation.

19. The pulse detonation system of claim 1, said cylindrical member further comprising a plurality of ports formed in a middle portion, each said port having a first end positioned adjacent said closed end of each detonation chamber and in flow communication therewith and a second end adjacent said aft surface thereof.

20. The pulse detonation system of claim 19, said stator further comprising at least one port formed in an aft portion thereof, wherein said cylindrical member ports are periodically aligned with said aft stator port so that gases in said detonation chambers are vented therethrough.

21. The pulse detonation system of claim 19, further comprising at least one device for initiating a detonation positioned adjacent said aft surface of said cylindrical member, wherein each said cylindrical member port is periodically aligned therewith.

22. The pulse detonation system of claim 1, further comprising a fuel manifold for supplying fuel to each said fuel port.

23. A pulse detonation system for a gas turbine engine having a longitudinal axis extending therethrough, comprising:
(a) a rotatable cylindrical member having a forward surface, an aft surface, and an outer circumferential surface, said cylindrical member including at least one stage of circumferentially spaced detonation chambers disposed therein, each said detonation chamber including an open first end located adjacent said outer circumferential surface of said cylindrical member and a closed second end located within a middle portion of said cylindrical member;
(b) a shaft rotatably connected to said cylindrical member;
(c) a stator configured in spaced arrangement around said forward surface, said aft surface, and said outer circumferential surface of said cylindrical member and a portion of said shaft said stator including at least one group of ports formed therein which sequentially align with said open end of said detonation chambers as said cylindrical member rotates;
(d) a fuel manifold formed in said shaft in flow communication with a source of fuel; and,
(e) a plurality of fuel passages formed in a middle portion of said cylindrical member, wherein each fuel passage is in flow communication with said fuel manifold at a first end and one of said detonation chambers at a second end.

24. The pulse detonation system of claim 23, further comprising:
(a) a heat exchanger positioned around each said detonation chamber, wherein said second end of each fuel passage is in flow communication therewith; and,
(b) a device for injecting fuel from said heat exchanger into each detonation chamber.

25. A method of providing power to a drive shaft in a gas turbine engine, comprising the following steps:
(a) providing a rotatable cylindrical member having at least one stage of circumferentially spaced detonation chambers therein, wherein each said detonation chamber includes an open first end located adjacent an outer circumferential surface of said cylindrical member and a closed second end located within a middle portion of said cylindrical member;
(b) providing a stator in spaced relation around said cylindrical member, said stator having at least one group of ports formed therein which sequentially align with said open end of said detonation chambers as said cylindrical member rotates;
(c) connecting said cylindrical member to a drive shaft;
(d) performing a detonation cycle in each said detonation chamber; and,
(e) producing a torque on said cylindrical member which causes said cylindrical member and said drive shaft to rotate.

26. The method of claim 25, said detonation cycle further comprising the steps of:
(a) supplying compressed air to said detonation chambers;
(b) injecting fuel into said detonation chambers;
(c) initiating a detonation of a fuel/air mixture in said detonation chambers; and,
(d) exhausting products of combustion from said detonation chambers.

27. The method of claim 26, wherein said detonation of said fuel/air mixture in said detonation chamber is initiated by a focused shock wave formed therein.

28. The method of claim 26, wherein said detonation is initiated at a predetermined point adjacent said closed end of said detonation chamber.

29. The method of claim 26, wherein said torque is created by reaction forces induced by said detonation cycle being applied to an end wall of said detonation chamber.

30. The method of claim 26, wherein detonation of said fuel/air mixture in said detonation chamber is initiated by an ignition device.

31. The method of claim 26, further comprising the step of causing said cylindrical member to rotate at a predetermined speed prior to injecting fuel into said detonation chambers.

32. The method of claim 26, further comprising the step of purging combustion gases from said detonation chambers.

33. The method of claim 26, further comprising the step of aligning said detonation chambers of each said detonation stage in a predetermined timing and sequence with an air port in said stator, a fuel port in circumferentially spaced relation to said air port, and an exhaust port in circumferentially spaced relation to said fuel port.

34. A gas turbine engine, comprising:
(a) a fan section at a forward end of said gas turbine engine including at least a first fan blade row connected to a drive shaft;
(b) a booster compressor positioned downstream of said fan section, said booster compressor including a first compressor blade row and a second compressor blade row connected to said drive shaft and interdigitated with said first compressor blade row; and,
(c) a pulse detonation system for powering said drive shaft, said pulse detonation system further comprising:
(1) a rotatable cylindrical member having a forward surface, an aft surface, and an outer circumferential surface, said cylindrical member including at least one stage of circumferentially spaced detonation chambers disposed therein, each said detonation chamber including an open first end, located adjacent an outer circumferential surface of said cylindrical member and a closed second end located within a middle portion of said cylindrical member, wherein said cylindrical member is connected to said drive shaft; and,
(2) a stator configured in spaced arrangement around said forward surface, said aft surface, and said outer circumferential surface of said cylindrical member and a portion of said shaft, said stator including at least one group of ports formed therein which sequentially align with said open end of said detonation chambers as said cylindrical member rotates;
wherein detonation cycles are performed in said detonation chambers of each said detonation stage so that reaction forces induced by said detonation cycles create a torque which causes said cylindrical member to rotate and power said fan section and said booster compressor.

35. The gas turbine engine of claim 34, each said group of ports in said stator further comprising:
(a) an air port in flow communication with a source of compressed air;
(b) a fuel port in flow communication with a fuel source; and,
(c) an exhaust port.

36. The gas turbine engine of claim 35, further comprising a precombustor in flow communication with a fuel supply and a supply of compressed air so as to produce detonable combustion products therein, said precombustor being in flow communication with each said fuel port in said stator.

37. The pulse detonation system of claim 34, said cylindrical member further comprising a plurality of internal passages formed therein, each said internal passage including a first end in flow communication with a first detonation chamber and a second end in flow communication with a second detonation chamber.

38. The pulse detonation system of claim 34, said cylindrical member further comprising a plurality of ports formed in a middle portion, each said port having a first end positioned adjacent said closed end of each detonation chamber and in flow communication therewith and a second end adjacent said aft surface thereof, wherein gases in said detonation chamber are vented therethrough.

39. The pulse detonation system of claim 38, further comprising at least one device for initiating a detonation positioned adjacent said aft surface of said cylindrical member, wherein each said cylindrical member port is periodically aligned therewith.

40. A gas turbine engine, comprising:
(a) a bellmouth at a forward end of said gas turbine engine;
(b) a compressor positioned downstream of and in flow communication with said bellmouth, said compressor including a first compressor blade row and a second blade row connected to a drive shaft and interdigitated with said first compressor blade row;
(c) a load connected to said drive shaft; and,
(d) a pulse detonation system for powering said drive shaft, said pulse detonation system further comprising:
(1) a rotatable cylindrical member having a forward surface, an aft surface, and an outer circumferential surface, said cylindrical member including at least one stage of circumferentially spaced detonation chambers disposed therein, each said detonation chamber including an open first end located adjacent an outer circumferential surface of said cylindrical member and a closed second end located within a middle portion of said cylindrical member, wherein said cylindrical member is connected to said drive shaft; and,
(2) a stator configured in spaced arrangement around said forward surface, said aft surface, and said outer circumferential surface of said cylindrical member and a portion of said shaft, said stator including at least one group of ports formed therein which sequentially align with said open end of said detonation chambers as said cylindrical member rotates;
wherein detonation cycles are performed in said detonation chambers of each said detonation stage so that reaction forces induced by said detonation cycles create a torque which causes said cylindrical member to rotate and power said compressor and said load.

41. The gas turbine engine of claim 40, each said group of ports in said stator further comprising:
(a) an air port in flow communication with a source of compressed air;
(b) a fuel port in flow communication with a fuel source; and,
(c) an exhaust port.

42. The pulse detonation system of claim 40, said cylindrical member further comprising a plurality of internal passages formed therein, each said internal passage including a first end in flow communication with a first detonation chamber and a second end in flow communication with a second detonation chamber.

43. The pulse detonation system of claim 40, said cylindrical member further comprising a plurality of ports formed in a middle portion, each said port having a first end positioned adjacent said closed end of each detonation chamber and in flow communication therewith and a second end adjacent said aft surface thereof, wherein gases in said detonation chamber are vented therethrough.

44. The pulse detonation system of claim 43, further comprising at least one device for initiating a detonation positioned adjacent said aft surface of said cylindrical member, wherein each said cylindrical member port is periodically aligned therewith.

45. The pulse detonation system of claim 1, where no ignition device is in communication with said detonation chambers.

46. The pulse detonation system of claim 1, wherein each said detonation chamber is substantially linear from said first end to said second end has has a substantially constant diameter.

* * * * *

UNITED STATES PATENT AND TRADEMARK OFFICE
CERTIFICATE OF CORRECTION

PATENT NO. : 6,889,505 B2
DATED : May 10, 2005
INVENTOR(S) : Lawrence Butler et al.

It is certified that error appears in the above-identified patent and that said Letters Patent is hereby corrected as shown below:

Column 12,
Line 2, delete "shaft said" and substitute -- shaft, said --.

Column 13,
Line 30, delete "end, located" and substitute -- end located --.

Column 14,
Line 64, delete "has" (first occurrence) and substitute -- and --.

Signed and Sealed this

Twenty-third Day of May, 2006

JON W. DUDAS
*Director of the United States Patent and Trademark Office*